United States Patent
Nishikawa et al.

(10) Patent No.: US 8,409,747 B2
(45) Date of Patent: Apr. 2, 2013

(54) NONAQUEOUS SECONDARY BATTERY SEPARATOR AND PROCESS FOR ITS FABRICATION

(75) Inventors: Satoshi Nishikawa, Iwakuni (JP); Hiroyuki Honmoto, Iwakuni (JP); Takahiro Daido, Iwakuni (JP)

(73) Assignee: Teijin Limited, Osaka (JP)

( * ) Notice: Subject to any disclaimer, the term of this patent is extended or adjusted under 35 U.S.C. 154(b) by 306 days.

(21) Appl. No.: 11/996,675

(22) PCT Filed: Jul. 25, 2005

(86) PCT No.: PCT/JP2005/013984
§ 371 (c)(1),
(2), (4) Date: Jan. 24, 2008

(87) PCT Pub. No.: WO2007/013179
PCT Pub. Date: Feb. 1, 2007

(65) Prior Publication Data
US 2010/0143783 A1    Jun. 10, 2010

(51) Int. Cl.
*H01M 2/14* (2006.01)
(52) U.S. Cl. ........ 429/145; 429/129; 429/142; 429/144; 429/247; 429/249
(58) Field of Classification Search .................. 429/129, 429/142, 144, 145, 247, 249
See application file for complete search history.

(56) References Cited

U.S. PATENT DOCUMENTS
2004/0161598 A1* 8/2004 Ohno et al. ............... 428/315.7

FOREIGN PATENT DOCUMENTS

| | | |
|---|---|---|
| CN | 1408466 A | 4/2003 |
| EP | 1 233 036 A1 | 8/2002 |
| EP | 1 298 740 A2 | 4/2003 |
| JP | 3-203160 A | 9/1991 |
| JP | 5-13062 A | 1/1993 |
| JP | 9-219184 A | 8/1997 |
| JP | 10-3898 A | 1/1998 |
| JP | 11-322989 A | 11/1999 |
| JP | 2001-23600 A | 1/2001 |
| JP | 2001-35468 A | 2/2001 |
| JP | 2001-206973 A | 7/2001 |
| JP | 2002-25526 A | 1/2002 |
| JP | 2002-355938 A | 12/2002 |
| JP | 2003-123724 A | 4/2003 |
| JP | 2003-171495 A | 6/2003 |
| JP | 2005-209570 A | 8/2005 |
| WO | 01/19906 A1 | 3/2001 |

OTHER PUBLICATIONS

JP-2002355938 Translation.*
Laman et al., "Impedance studies for separators in rechargeable lithium batteries," Electrochemical Society Letters, Advanced Energy Technologies Incorporated, Burnaby, British Columbia, J. Electrochem. Soc., vol. 140, No. 4, pp. L51-L53, Apr. 1993.

* cited by examiner

*Primary Examiner* — Patrick Ryan
*Assistant Examiner* — Ladan Mohaddes
(74) *Attorney, Agent, or Firm* — Sughrue Mion, PLLC

(57) ABSTRACT

A nonaqueous secondary battery separator which is a composite porous membrane obtained by integrally covering both sides of a polyolefin microporous membrane having a gas permeability (JIS P8117) of between 15 seconds/100 cc·μm and 50 seconds/100 cc·μm per unit thickness and a film thickness of between 5 μm and 25 μm, with a porous layer composed of polymetaphenylene isophthalamide, and which exhibits both a shutdown function and effective heat resistance for meltdown resistance, as features desired for high-energy-density, high-output, large-sized, high-performance nonaqueous secondary batteries, while also having excellent handleability and ion permeability. The film thickness of the composite porous membrane is between 6 μm and 35 μm, the gas permeability (JIS P8117) is between 1.01 and 2.00 times that of the polyolefin microporous membrane, and the polymetaphenylene isophthalamide coating amount is between 1.0 g/m$^2$ and 4.0 g/m$^2$.

22 Claims, No Drawings

NONAQUEOUS SECONDARY BATTERY SEPARATOR AND PROCESS FOR ITS FABRICATION

TECHNICAL FIELD

The present invention relates to a nonaqueous secondary battery separator and to a process for its fabrication. More specifically, it relates to a separator that significantly improves the safety of nonaqueous secondary batteries, and to technology for its fabrication.

BACKGROUND ART

Nonaqueous secondary batteries that produce electromotive force by doping/dedoping of lithium (lithium ion secondary batteries) are characterized by high energy density and are therefore widely used as main power supplies for portable electronic devices such as cellular phones, laptop computers and the like. In light of demands for higher performance and longer operation of such portable electronic devices, active research and development is being carried out with the aim of increasing energy density and output. Upsizing is another target of investigation for use as power sources in automobiles and the like. When dealing with increases in energy density, output and size, however, one of the major issues to be considered is safety assurance.

Lithium ion secondary battery separators currently employ polyolefin microporous membranes composed mainly of polyethylene, and such batteries are provided with a shutdown function to ensure safety. This function is described in Japanese Patent Publication No. 2642206. The shutdown function is a function whereby the polyolefin constituent material of the separator melts to close the pores and markedly increase the resistance of the separator. When a problem occurs in the battery that causes temperature rise, the internal resistance of the battery increases by this function to essentially stop the flow of current and ensure safety.

Because the shutdown function is based on the working principle of shutting the pores by melting of the constituent material, exposure of the battery to even higher temperature causes rupture of the separator (meltdown) and internal shorting between the positive electrode and negative electrode, rendering the battery extremely dangerous. Increasing the energy density, output and size of a lithium ion secondary battery causes a faster heat release rate when a problem occurs, and therefore closing of the pores is not sufficiently rapid and shutdown fails to function, thereby increasing the risk of meltdown. As a result, it has been difficult to ensure safety with conventional separators having a shutdown function when the energy density, output and size are increased, such that highly heat resistant materials that do not undergo meltdown have been essential.

A separator that is obtained by laminating a polyethylene microporous membrane and a polytetrafluoroethylene microporous membrane has been proposed in J. Electrochem. Soc., 140, L51(1993), for both a shutdown function and heat resistance that prevents meltdown. The shutdown function is satisfactorily exhibited, and no meltdown has been observed in temperature ranges of up to 250° C. Examples of laminating porous membranes composed of polyolefin microporous membranes and heat resistant resins are proposed in Japanese Unexamined Patent Publication HEI No. 10-3898, Japanese Unexamined Patent Publication No. 2002-25526 and Japanese Unexamined Patent Publication No. 2003-123724.

In addition, composite porous membranes obtained by integrally coating porous layers made of heat resistant resins onto polyolefin microporous membranes have been proposed in Japanese Unexamined Patent Publication No. 2001-23600 and Japanese Unexamined Patent Publication No. 2002-355938, as separators with both a shutdown property and heat resistance.

DISCLOSURE OF THE INVENTION

At the current time it is technically difficult to laminate two membranes with different properties, such as a polyolefin microporous membrane having a shutdown function and a heat resistant porous membrane, and therefore the practical utility has been minimal. Demand is also increasing for even thinner separators, as batteries tend toward ever higher energy densities. In order to achieve current separator thickness levels with lamination of two membranes, it has been necessary to significantly reduce the thickness of each membrane. Such thin membranes are difficult to fabricate and troublesome to manage, and are of low practical utility for the purpose of separator fabrication.

On the other hand, polyolefin microporous membranes integrally coated with heat resistant porous layers are not subject to the aforementioned problems of laminated membranes. In most cases proposed to date, however, such membranes have involved coating on only one side of the polyolefin microporous membrane, and consequently curling has negatively impacted handleability. When these are actually used for production of batteries, misalignments occur that result in shorting or poor output. While not all of these patent publications necessarily describe coating on one side, they do not specifically and concretely disclose methods for coating on both sides. Moreover, coating-integrated membranes of the prior art tend to have blocking at the interface between the polyolefin microporous membrane and heat resistant porous layer, and this has often been responsible for a reduced shutdown function and reduced battery performance.

It is therefore an object of the present invention to provide a separator having satisfactory handleability and providing both a shutdown function and heat resistance that can sufficiently prevent meltdown, as well as having a suitable interface design that minimizes blocking so that battery performance is not reduced.

The present inventors have conducted ardent research on the problems mentioned above. As a result, it has been found that a separator with good handleability, a shutdown function and heat resistance, without reduction in ion permeability, can be obtained by selecting a polyolefin microporous membrane with a suitable morphology as a composite porous membrane base material, selecting a polymer that easily forms a porous structure as the polymer for the heat resistant porous layer, and integrally forming the heat resistant porous layer on both sides of the polyolefin microporous membrane, in a manner for a suitable morphology. Specifically, the invention provides a nonaqueous secondary battery separator which is a composite porous membrane obtained by integrally coating both sides of a polyolefin microporous membrane having a gas permeability (JIS P8117) of between 15 seconds/100 cc·µm and 50 seconds/100 cc·µm per unit thickness and a film thickness of between 5 µm and 25 µm, with a porous layer composed of polymetaphenylene isophthalamide, characterized in that the film thickness of the composite porous membrane is between 6 µm and 35 µm, the gas permeability (JIS P8117) is between 1.01 and 2.00 times that of the polyolefin microporous membrane and the polymetaphenylene isophthalamide coating amount is between 1.0 g/m$^2$ and 4.0 g/m$^2$. The following aspects of the invention are also provided.

1. A nonaqueous secondary battery separator according to the invention as described above, characterized in that the pore size of the polyolefin microporous membrane is between 0.01 µm and 0.2 µm.

2. A nonaqueous secondary battery separator according to the invention as described above, or according to 1. above, characterized in that for the polymetaphenylene isophthalamide coating amount, the value: |coating amount on surface−coating amount on back|/(coating amount on surface+coating amount on back) is between 0 and 0.2.

3. A nonaqueous secondary battery separator according to the invention as described above or according to 1. or 2. above, wherein the polyolefin microporous membrane is a polyolefin microporous membrane composed mainly of polyethylene.

The invention further provides the following specific processes for fabrication of the separator described above. A process for fabrication of a nonaqueous battery separator of the invention comprises the following steps in order:

(1) a step of dissolving polymetaphenylene isophthalamide in a solvent composed mainly of an amide-based solvent to prepare a polymer solution, (2) a step of coating both sides of the polyolefin microporous membrane with the polymer solution, (3) a step of transporting the polymer solution-coated polyolefin microporous membrane, (4) a step of immersing the polymer solution-coated polyolefin microporous membrane in a solidifying solution comprising the solvent and water in such a manner that both the front and back sides contact with the solidifying solution for solidification of the polymetaphenylene isophthalamide, (5) a step of rinsing the solidified composite membrane, and (6) a step of drying the rinsed composite membrane.

The invention further provides the aforementioned process for fabrication of a nonaqueous secondary battery separator characterized in that the polymer solution contains a phase separating agent in a concentration of 5-50 wt %, and a process for fabrication of a nonaqueous secondary battery separator characterized in that the proportion of water in the solidifying solution is 30-80 wt %.

BEST MODE FOR CARRYING OUT THE INVENTION

The nonaqueous secondary battery separator of the invention is a composite porous membrane obtained by integrally coating both sides of a polyolefin microporous membrane with a porous layer composed of polymetaphenylene isophthalamide.

The polyolefin microporous membrane used in the nonaqueous secondary battery separator of the invention preferably has a gas permeability (JIS P8117) per unit thickness of between 15 seconds/100 cc·µm and 50 seconds/100 cc·µm. The gas permeability reflects the morphology of the polyolefin microporous membrane, with a smaller numerical value indicating a polyolefin microporous membrane having pores with larger pore sizes and having low tortuosity. A larger value, conversely, indicates pores with small pore sizes and a high tortuosity. In the nonaqueous secondary battery separator of the invention, the polyolefin microporous membrane is covered with a porous layer made of polymetaphenylene isophthalamide, but a gas permeability of lower than 15 seconds/100 cc·µm will result in a more notable phenomenon in which the polymetaphenylene isophthalamide enters and blocks the pores of the polyolefin microporous membrane. This can significantly reduce the discharge characteristic and prevent the shutdown function from being satisfactorily exhibited. From this standpoint, the polyolefin microporous membrane used in the nonaqueous secondary battery separator of the invention preferably has a gas permeability (JIS P8117) of at least 15 seconds/100 cc·µm and more preferably at least 20 seconds/100 cc·µm. If the gas permeability is higher than 50 seconds/100 cc·µm there will be less reduction in performance due to blocking by the coating, but the ion permeability of the polyolefin microporous membrane itself will become insufficient and it will be difficult to obtain adequate battery performance. From the viewpoint of obtaining satisfactory battery performance, the gas permeability is preferably no greater than 50 seconds/100 cc·µm and even more preferably no greater than 40 seconds/100 cc·µm. In other words, the gas permeability of the polyolefin microporous membrane is preferably between 15 seconds/100 cc·µm and 50 seconds/100 cc·µm, more preferably between 20 seconds/100 cc·µm and 50 seconds/100 cc·µm and even more preferably between 20 seconds/100 cc·µm and 40 seconds/100 cc·µm.

The film thickness of the polyolefin microporous membrane is preferably between 5 µm and 25 µm. A lower film thickness is preferred for the polyolefin microporous membrane in consideration of energy density of the battery. However, sufficient mechanical properties are necessary from a productivity standpoint and this limits the degree of possible thickness reduction. With polyolefin microporous membranes as conventional separators, designs take into account not only the energy density and mechanical properties as mentioned above but also the shutdown property, meltdown resistance and ion permeability, and a film thickness in the range of 15 µm-25 µm is generally implemented as the suitable range. Since the nonaqueous secondary battery separator of the invention is coated with polymetaphenylene isophthalamide, a relatively thin polyolefin microporous membrane can be used. That is, the film thickness of the polyolefin microporous membrane is preferably at least 5 µm and even more preferably at least 10 µm. The film thickness of the polyolefin microporous membrane is also preferably no greater than 25 µm, more preferably no greater than 20 µm and even more preferably no greater than 15 µm. Specifically, the film thickness of the polyolefin microporous membrane is preferably between 5 µm and 25 µm, more preferably between 5 µm and 20 µm, even more preferably between 10 µm and 20 µm or between 5 µm and 15 µm, and most preferably between 10 µm and 15 µm.

The pore size of the polyolefin microporous membrane is preferably between 0.01 µm and 0.2 µm. The pore size referred to here can be determined by observation with a scanning electron microscope (SEM). According to the invention, the surface of the polyolefin microporous membrane is observed with an SEM and 10 pores are arbitrarily selected and measured, after which the average is calculated and the result recorded as the pore size. Since both sides of the polyolefin microporous membrane are coated with polymetaphenylene isophthalamide in a separator of the invention, a sufficient pore size of the polyolefin microporous membrane will allow infiltration of the polymetaphenylene isophthalamide and cause blocking. A very small pore size will make it difficult to achieve satisfactory battery performance. Therefore the pore size of the polyolefin microporous membrane is preferably in the range of 0.01 µm to 0.2 µm.

The material of the polyolefin microporous membrane preferably consists primarily of polyethylene. Polyethylene-based materials are able to exhibit the most optimal shutdown function. Specifically, the polyethylene content is preferably at least 70 wt % and even more preferably at least 90 wt %.

In the nonaqueous secondary battery separator of the invention, a porous layer composed of polymetaphenylene isophthalamide is coated onto both sides of the aforementioned polyolefin microporous membrane, and the two are integrated. The coated porous layer has sufficient heat resistance and significantly inhibits meltdown of the polyolefin microporous membrane.

The polyphenyleneisophthalamide used for the invention preferably has a logarithmic viscosity in the range of 0.8-2.5 dL/g and preferably 1.0-2.2 dl/g, as represented by formula (1) below, when dissolved in N-methyl-pyrrolidone. A logarithmic viscosity of lower than 0.8 dL/g will not result in sufficient properties, while a logarithmic viscosity exceeding 2.5 dL/g will make it difficult to obtain a stable polymer solution and a uniform porous layer will not be formed.

$$\text{Logarithmic viscosity (units: dL/g)} = \ln(T/T0)/C \quad (1)$$

T: Flow time for solution of 0.5 g polyphenylene isophthalamide in 100 mL of N-methyl-pyrrolidone through a capillary viscometer at 30° C.

T0: Flow time for N-methyl-pyrrolidone through a capillary viscometer at 30° C.

C: Concentration (g/dL) of polyphenylene isophthalamide in solution.

The concept of coating polyolefin microporous membranes with porous layers made of highly heat resistant materials to inhibit meltdown has existed in the prior art. However, the conventional coatings are on one side, whereas a feature of the invention is that the coating is on both sides. Coating on one side is generally considered to be convenient in terms of the coating process, but the post-coating handleability is significantly impaired due to curling. A particular problem is misalignment during the battery fabrication process due to curling. This negatively affects the performance due to shorting or poor output of the battery, and notably lowers the battery productivity. However, a membrane coated on both sides does not exhibit curling problems and has satisfactory handleability. Specifically, curling can be significantly prevented by satisfying the condition that the value of |coating amount on surface−coating amount on back|/(coating amount on surface+coating amount on back) is between 0 and 0.2, for the polymetaphenylene isophthalamide coating amount. The value is preferably between 0 and 0.1, and most preferably between 0 and 0.05 or between 0 and 0.01. The front and back sides were designated here for convenience, but the membrane is not directional. If one side is designated as the front, then the other becomes the back. Also, the coating amount referred to here may be defined based on either weight or film thickness. For weight, either side may be peeled off to determine the coating amount on one side. Film thickness can be determined by cross-sectional observation with a scanning electron microscope (SEM).

It is another feature of the invention that polymetaphenylene isophthalamide is used as the coating material. Polymetaphenylene isophthalamide is a meta-type total aromatic polyamide. Para-type total aromatic polyamides and polyimides have been proposed in the past. Polymetaphenylene isophthalamide more easily forms a porous structure with large pore sizes than do these previously proposed materials. In order to form a satisfactory interface with minimal blocking, the coating porous layer must have a sufficiently larger pore size than the polyolefin microporous membrane. Thus, it is possible to form a more satisfactory interface with the polyolefin microporous membrane than with systems proposed in the prior art, making it easier to obtain a membrane with virtually no inhibition of the ion permeability or shutdown function. This feature allows double-sided coatings where two interfaces are formed.

Another feature of polymetaphenylene isophthalamide is that it readily dissolves in amide-based solvents. Systems proposed to date include a step of coating the polyolefin microporous membrane with a polymer solution obtained by dissolving the polymer in a solvent, in an integral coating step. Because polymer solubility is insufficient in conventional systems, it has been common to adopt methods such as adding a third component such as a salt during production of the polymer solution, or coating a mixture of the polymer precursor solution with an added catalyst for polymerization reaction after coating. A copolymer is also used in some cases. Addition of other components is not preferred because they can adversely affect the electrochemical stability. With polymetaphenylene isophthalamide, the polymer solubility is high and simple dissolution is therefore possible. Moreover, because the electrochemical stability of the polymer itself is also high, the potential for adverse effects on battery durability is greatly reduced compared to conventional systems. Easier production of the coating solution is, furthermore, a desirable feature from the standpoint of productivity.

In the nonaqueous secondary battery separator of the invention, the porous layer composed of polyphenylene isophthalamide is integrally formed with the polyolefin microporous membrane. The method of integral formation will be described hereunder, and "integral" is to be understood as meaning that the layers cannot be easily separated with ordinary handling. This concept of "integral" is adequately achieved by fabrication according to the method described hereunder.

The nonaqueous secondary battery separator of the invention is such a type of an "integral" composite porous membrane. It is a feature of the nonaqueous secondary battery separator of the invention that the gas permeability (JIS P8117) of the composite porous membrane is at least 1.01 times and no greater than 2.00 times that of the polyolefin microporous membrane. The value of between 1.01 and 2.00 represents a condition in which a satisfactory interface has been formed between the polyolefin microporous membrane and polymetaphenylene isophthalamide porous layer, created by formation of a composite, with minimal undesirable conditions such as plugging at the interface. Such a numerical value can be easily achieved by selecting the materials and forming a composite by the method described hereunder. If the value is less than 1.01, a meltdown-inhibiting effect will no longer be exhibited by the coating, and the properties exhibited will be those of the polyolefin microporous membrane alone. If the value is greater than 2.00, undesirable plugging of the pores will become notable, leading to reduced discharge performance and a poor shutdown function.

The film thickness of the nonaqueous secondary battery separator of the invention is preferably at least 6 μm and no greater than 35 μm. The total coated thickness on both sides is preferably in the range of 1 μm to 10 μm, and therefore the preferred range for the separator is 6-35 μm in consideration of the thickness of the polyolefin microporous membrane. A smaller separator film thickness is of course preferable from the viewpoint of battery energy density, and it is more preferably no greater than 30 μm, even more preferably no greater than 25 μm and most preferably no greater than 20 μm. The total coated thickness on both sides is more preferably no greater than 5 μm.

The coating amount of the polymetaphenylene isophthalamide is preferably in the range of 1.0 g/m² to 4.0 g/m². Here, the coating amount is the total on both sides. If the coating amount is less than 1.0 g/m², the effect of the polymetaphenylene isophthalamide coating will not be sufficiently achieved. If it is greater than 4.0 g/m² the coated thickness will be excessive, leading to problems such as inhibited ion permeability at sections of the polymetaphenylene isophthalamide porous layer.

The nonaqueous secondary battery separator of the invention is manufactured by the following steps in order:

(1) a step of dissolving polymetaphenylene isophthalamide in a solvent composed mainly of an amide-based solvent to prepare a polymer solution, (2) a step of coating both sides of the polyolefin microporous membrane with the polymer solution, (3) a step of transporting the polymer solution-coated polyolefin microporous membrane, (4) a step of immersing the polymer solution-coated polyolefin microporous membrane in a solidifying solution comprising the solvent and water in such a manner that both the front and back sides contact with the solidifying solution for solidification of the polymetaphenylene isophthalamide, (5) a step of rinsing the solidified composite membrane, and (6) a step of drying the rinsed composite membrane.

It is a major feature of this production process that the polymetaphenylene isophthalamide solution is coated onto both sides of the polyolefin microporous membrane, which is then immersed in a solidifying solution so that both the front and back sides contact the solidifying solution for solidification of the polyphenylene isophthalamide. Using this process, it is possible to easily achieve coating of both sides of the polyolefin microporous membrane with the polyparaphenylene isophthalamide porous layer in an integral manner. Since coating of both sides is accomplished simultaneously in this process, it is possible to realize a high level of productivity. In attempting to form a satisfactory interface between the polyolefin microporous membrane and polyphenylene isophthalamide, problems such as plugging may occur due to seepage of the polymer solution into the polyolefin microporous membrane during the period from coating of the polymer solution until solidification. This depends on the viscosity of the polymer solution and the time from coating until solidification, and can be easily controlled by adjusting the transport speed and the distance between the coating apparatus and the coagulating bath when carrying out the production process.

As amide-based solvents there may be mentioned dimethylacetamide, N-methylpyrrolidone, dimethylformamide and the like. The solvent for the polymer solution in the present production process is preferably such an amide-based solvent, but in some cases it is preferred to use a mixed solvent that also contains a phase separating agent. The concentration of the phase separating agent is preferably in the range of 5-50 wt % with respect to 100 as the total solvent weight. As phase separating agents there may be mentioned polypropylene glycol, tripropylene glycol, ethylene glycol, methanol, ethanol, butanediol, polyvinylpyrrolidone and the like.

The concentration of the polyphenylene isophthalamide in the polymer solution is preferably in the range of 5-15 wt %.

For simultaneous coating of the polymer solution onto both sides of a polyolefin microporous membrane, the polyolefin microporous membrane is passed between two opposed coating applicators and the polymer solution is supplied from both sides to achieve simultaneous coating on both sides. Specifically, the polyolefin microporous membrane may be passed between two Meyer bars or two dies and both sides coated simultaneously. Employing such a method will make it easier to achieve equal coating on both sides. It will thus be possible to produce a separator of the invention without curling.

After coating of the polymer solution, the polyolefin microporous membrane must be transported into the solidifying solution. A preferred method is one wherein the solidifying solution is placed under the coating applicator so that immersion can be performed continuously after coating. The transport speed and the distance between the coating applicator and the solidifying solution are important with respect to the morphology of the polyolefin microporous membrane and the viscosity of the polymer solution, and these can be suitably adjusted so as to obtain a separator according to the invention.

Penetration of the polyolefin microporous membrane into the solidifying solution creates contact of the front and back sides with the solidifying solution. This permits simultaneous solidification of both sides, so that the front and back sides can be integrally coated. Since the method described above forms a porous layer composed of polymetaphenylene isophthalamide having the same morphology on the front and back sides, the product has no front-back anisotropy. Consequently, it is resistant to curling and has satisfactory handleability. The product can also be more easily managed and front-back orientation does not need to be considered for use.

The solidifying solution is preferably a mixture of water with the solvent used for the polymer solution. The proportion of water is most preferably in the range of 30-80 wt %.

There are no particular restrictions on the method of rinsing, and conditions allowing adequate rinsing of the solvent are sufficient.

The drying step also has no particular restrictions, and any conventional method may be applied. As examples there may be mentioned methods of contacting with a heated roller for drying, or methods of drying with hot air.

EXAMPLES

The present invention will now be explained in greater detail by examples.

[Measuring Methods]

[Measurement of Polyolefin Microporous Membrane Pore Size]

The surface of the polyolefin microporous membrane was observed with a scanning electron microscope (SEM). Ten pores were arbitrarily selected, and the pore size was calculated as the average of the pore sizes of those pores.

[Measurement of Film Thickness]

A contact thickness gauge (LITEMATIC by Mitsutoyo Corp.) was used. The measuring tip had a diameter of 5 mm, and an adjusted load of 7 g was applied during the measurement.

[Measurement of Basis Weight]

The basis weight was determined by cutting out and weighing a 10 cm×10 cm sample. The basis weight was calculated as the weight divided by the area

[Measurement of Coating Amount]

The coating amount by weight was calculated by subtracting the basis weight of the polyolefin microporous membrane from the basis weight of the composite porous membrane. The coating amount on each side was calculated by peeling off one side and determining its basis weight, and subtracting the basis weight of the polyolefin microporous membrane from it.

The coating amount by thickness was calculated by subtracting the film thickness of the polyolefin microporous membrane from the film thickness of the composite porous membrane. The coating amount on each side was calculated by peeling off one side and determining its thickness, and subtracting the thickness of the polyolefin microporous membrane from it.

[Measurement of Gas Permeability]

The gas permeability was measured according to JIS P8117.

[Evaluation of Gas Permeability Per Unit Thickness]

The gas permeability was divided by the film thickness to calculate the gas permeability per unit thickness.

[Change in Gas Permeability of Composite Porous Membrane]

The gas permeability of the composite porous membrane was divided by the gas permeability of the polyolefin microporous membrane to calculate the change in gas permeability.

[Measurement of Shutdown Property]

The shutdown property was evaluated by impregnating the separator with an electrolyte solution 1 M $LiBF_4$ PC/EC (1/1 weight ratio), sandwiching it with 15.5 mm diameter SUS plates and enclosing it into a button battery can to prepare a trial cell for evaluation. The cell was placed in a temperature-controllable thermostatic bath, the temperature was raised to 250° C. at 1.5° C./min, and the resistance value of the cell was measured. The resistance value of the cell was measured by the alternating current method. As the measuring conditions for the alternating current method, a current of 10 mV amplitude, 1 kHz frequency was applied and the real axis component was recorded as the cell resistance. The cell resistance was plotted against temperature, and the shutdown temperature and meltdown temperature were measured. The shutdown temperature is the temperature at which the resistance value rises above 1000 ohm, while the meltdown temperature is the temperature at which the resistance value falls below 1000 ohm.

[Measurement of Battery Performance]

A positive electrode paste was prepared using a 6 wt % solution of polyvinylidene fluoride (product of Kureha Corp.) in N-methylpyrrolidone, which contained 89.5 parts by weight of lithium cobaltate powder ($LiCoO_2$, product of Nippon Chemical Industrial Co., Ltd.) and 4.5 parts by weight of acetylene black powder (DENKA BLACK, product of Denki Kagaku Kogyo Co., Ltd.) as positive electrode active materials, for a polyvinylidene fluoride dry weight of 6 parts by weight. The obtained paste was coated onto an aluminum foil to a thickness of 20 µm, and after drying, it was pressed to fabricate a positive electrode.

Also, a negative electrode paste was prepared using a 6 wt % solution of polyvinylidene fluoride (product of Kureha Corp.) in N-methylpyrrolidone, which contained 87 parts by weight of graphitized mesophase carbon microbeads (MCMB, product of Osaka Gas Co., Ltd.) and 3 parts by weight of acetylene black as negative electrode active materials, for a polyvinylidene fluoride dry weight of 10 parts by weight. The obtained paste was coated onto a copper foil to a thickness of 18 µm, and after drying, it was pressed to fabricate a negative electrode.

The positive electrode was cut to a size of 30 mm×50 mm and given a tab. The negative electrode was cut to a size of 32 mm×52 mm and also given a tab. The separator was cut to a size of 36 mm×56 mm. The positive electrode/separator/negative electrode complex was bonded together, and then an electrolyte solution was injected in and the entirety was enclosed in an aluminum laminated film to fabricate an aluminum laminate-clad cell. The electrolyte solution used was a 1 M solution of $LiPF_6$ in ethylene carbonate/ethyl methyl carbonate (3/7 weight ratio).

For this cell, the discharge strength of this cell was measured at 0.2 C and 2 C, and the battery performance was determined as: (discharge strength at 2 C)/(discharge strength at 0.2 C)×100. The charge conditions were 0.2 C, 4.2 V, CC/CV, 8 hours and the discharge conditions were CC discharge with 2.75 V cutoff.

[Composite Porous Membrane Production Example]

A membrane-forming polymer solution was prepared with a composition of 6.0 wt % polymetaphenylene isophthalamide (Conex™ by Teijin Techno Products, Ltd.), 65.8 wt % of dimethylacetamide (DMAc) and 28.2 wt % of tripropylene glycol (TPG). The polymetaphenylene isophthalamide used had a logarithmic viscosity of 1.4 dL/g. The polyolefin microporous membrane was passed through a die and the membrane-forming polymer solution was supplied and coated onto both sides of the polyolefin microporous membrane by the die. The coated polyolefin microporous membrane was then immersed into a solidifying solution having a composition of 35 wt % DMAc, 15 wt % TPG and 50 wt % water, with both sides in contact therewith. It was then rinsed and dried to obtain a composite porous membrane as a non-aqueous secondary battery separator.

[Test Example]

[Analysis of Polyolefin Microporous Membrane]

The polyolefin microporous membranes A, B and C in Table 1 were used to make composite porous membranes each equivalent to the composite porous membrane described above. For the analysis, the die was adjusted so as to supply an equal amount of membrane-forming polymer solution to both sides of each polyolefin microporous membrane. The properties of the obtained samples are shown in Table 2.

As shown in Table 2, selection of a polyolefin microporous membrane with a suitable gas permeability and pore size can enhance the meltdown-inhibiting effect without impairing the shutdown function of the polyolefin microporous membrane. On the other hand, inappropriate selection of the polyolefin microporous membrane impairs the shutdown function of the polyolefin microporous membrane.

[Analysis of Coating Amount]

Polyolefin microporous membrane B in Table 1 was used. A composite porous membrane was fabricated according to the composite porous membrane production example described above. For the analysis, the die was adjusted so as to supply an equal amount of membrane-forming polymer solution to both sides of each polyolefin microporous membrane. The coating amount was controlled by adjusting the supply of membrane-forming polymer solution from the die and the die clearance, to fabricate the samples listed in Table 3.

As shown in Table 3, an inappropriate coating amount makes it impossible to simultaneously achieve good battery performance, a shutdown property and meltdown inhibition.

[Analysis of Coating Balance on Front and Back]

Polyolefin microporous membrane B in Table 1 was used. A composite porous membrane was fabricated according to the composite porous membrane production example described above. For this analysis, the die was adjusted so as to supply different amounts of the membrane-forming polymer solution to either side of the polyolefin microporous membrane, to fabricate the samples listed in Table 4.

As shown in Table 4, a poor coating balance results in curling and inadequate handleability of the composite porous membrane.

The test examples described above confirm the favorable construction of a composite porous membrane for a nonaqueous secondary battery separator according to the invention. The following is a working example of a separator designed based on the results of the test examples.

This working example will serve as a more concrete explanation of the invention. The example and explanation thereof serve only for the purpose of illustration of the invention, and other modes may of course be implemented such as are within the scope of the invention.

EXAMPLE

A polyethylene microporous membrane (E-16 MMS, product of Tonen Chemical Co., Ltd.) was used as the polyolefin microporous membrane. The polyolefin microporous membrane had a film thickness of 17 µm, a gas permeability per unit thickness of 25 seconds/100 cc·µm and a pore size of 0.1 µm. A composite porous membrane was fabricated according to the composite porous membrane production example described above. The die was adjusted so that an equal amount of membrane-forming polymer solution was supplied from the die. The obtained composite porous membrane had a gas permeability of 1.4 times that of the polyolefin microporous membrane, while the film thickness was 20 µm and the coating amount was 1.6 g/m². The coating amount on the front was 0.8 g/m² by weight to a thickness of 1.5 µm, the coating amount on the back was 0.8 g/m² by weight to a thickness of 1.5 µm, and the condition: |front coating amount−back coating amount|/(front coating amount+back coating amount)=0 was satisfied based on both weight and thickness.

The shutdown property and battery performance of the composite porous membrane were evaluated. The shutdown temperature was 141° C., and no meltdown temperature was observed up to 250° C. The battery performance was 94%, which was equivalent to the polyethylene microporous membrane before coating.

TABLE 1

| Manufacturer of polyolefin microporous membrane | Material | Film thickness µm | Basis weight g/m² | Gas permeability (per unit thickness) sec/100 cc · µm | Pore size µm | Battery performance % | Shutdown properties | |
|---|---|---|---|---|---|---|---|---|
| | | | | | | | Shutdown temperature ° C. | Meltdown temperature ° C. |
| A Tonen | PE | 21 | 12.3 | 25 | 0.1 | 92 | 137 | 152 |
| B Tonen | PE | 17 | 10.7 | 25 | 0.1 | 94 | 138 | 152 |
| C Asahi Chemical | PE | 18 | 8.5 | 5.4 | 0.3 | 95 | 148 | 158 |

*Polyethylene abbreviated as PE.

TABLE 2

| Sample No. | Polyolefin microporous membrane | Change in gas permeability (times) | Shutdown properties | |
|---|---|---|---|---|
| | | | Shutdown temperature ° C. | Meltdown temperature ° C. |
| 1 | A | 1.8 | 141 | >250 |
| 2 | B | 1.4 | 141 | >250 |
| 3 | C | 2.8 | No shutdown function | |

TABLE 3

| Sample No. | Coating amount (Total for both sides) g/m² | Change in gas permeability (times) | Battery performance % | Shutdown properties | |
|---|---|---|---|---|---|
| | | | | Shutdown temperature ° C. | Meltdown temperature ° C. |
| 4 | 0.5 | 1.1 | 94 | 139 | 173 |
| 5 | 1.8 | 1.4 | 94 | 141 | >250 |

TABLE 3-continued

| Sample No. | Coating amount (Total for both sides) g/m² | Change in gas permeability (times) | Battery performance % | Shutdown properties | |
|---|---|---|---|---|---|
| | | | | Shutdown temperature ° C. | Meltdown temperature ° C. |
| 6 | 2.4 | 1.6 | 93 | 145 | >250 |
| 7 | 4.5 | 2.1 | 75 | No shutdown function | |

TABLE 4

| Sample No. | Amount supplied | | Coating amount g/m² | | Coating thickness μm | | |
|---|---|---|---|---|---|---|---|
| | Surface | Back | Surface | Back | Surface | Back | Curling |
| 8 | 1.0 | 1.0 | 1.0 | 1.0 | 1.5 | 1.5 | No |
| 9 | 1.0 | 0.8 | 1.1 | 0.8 | 1.6 | 1.2 | No |
| 10 | 1.0 | 0.5 | 1.2 | 0.4 | 1.8 | 0.6 | Yes |
| 11 | 1.0 | 0 | 1.4 | 0 | 2.0 | 0 | Yes |

*Listed as 1.0 for the amount supplied to the front, relative value for the back.

INDUSTRIAL APPLICABILITY

According to the invention it is possible to provide a nonaqueous secondary battery separator that exhibits both a shutdown function and effective heat resistance for meltdown resistance, which are desired for high-energy-density, high-output, large-sized, high-performance nonaqueous secondary batteries, and that also has excellent handleability and ion permeability.

What is claimed is:

1. A nonaqueous secondary battery separator which is a composite porous membrane obtained by integrally coating both sides of a polyolefin microporous membrane having a gas permeability (JIS P8117) of between 15 seconds/100 cc·μm and 50 seconds/100 cc·μm per unit thickness and a film thickness of between 5 μm and 25 μm, with a porous layer composed of polymetaphenylene isophthalamide, characterized in that the film thickness of the composite porous membrane is between 6 μm and 35 μm, the gas permeability (JIS P8117) is between 1.01 and 2.00 times that of the polyolefin microporous membrane and the polymetaphenylene isophthalamide total coating amount of both sides is between 1.0 g/m² and 4.0 g/m².

2. A nonaqueous secondary battery separator according to claim 1, characterized in that the pore size of the polyolefin microporous membrane is between 0.01 μm and 0.2 μm.

3. A nonaqueous secondary battery separator according to claim 1, characterized in that the polymetaphenylene isophthalamide coating amount is such that the value of |coating amount on one surface of the membrane−coating amount on the other surface of the membrane|/(coating amount on one surface of the membrane+coating amount on the other surface of the membrane) is between 0 and 0.2.

4. A nonaqueous secondary battery separator according to claim 1, wherein the polyolefin microporous membrane is a polyolefin microporous membrane composed mainly of polyethylene.

5. A process for fabrication of a nonaqueous battery separator according to claim 1, comprising the following steps in order:
(1) a step of dissolving polymetaphenylene isophthalamide in a solvent composed mainly of an amide-based solvent to prepare a polymer solution,
(2) a step of coating both sides of the polyolefin microporous membrane with the polymer solution,
(3) a step of transporting the polymer solution-coated polyolefin microporous membrane,
(4) a step of immersing the polymer solution-coated polyolefin microporous membrane in a solidifying solution comprising the solvent and water in such a manner that both the front and back sides contact with the solidifying solution for solidification of the polymetaphenylene isophthalamide,
(5) a step of rinsing the solidified composite membrane, and
(6) a step of drying the rinsed composite membrane.

6. A process for fabrication of a nonaqueous secondary battery separator according to claim 5, characterized in that the polymer solution contains a phase separating agent at a concentration of 5-50 wt %.

7. A process for fabrication of a nonaqueous secondary battery separator according to claim 5, characterized in that the proportion of water in the solidifying solution is 30-80 wt %.

8. A nonaqueous secondary battery separator according to claim 2, characterized in that the polymetaphenylene isophthalamide coating amount is such that the value of |coating amount on one surface of the membrane−coating amount on the other surface of the membrane|/(coating amount on one surface of the membrane+coating amount on the other surface of the membrane) is between 0 and 0.2.

9. A nonaqueous secondary battery separator according to claim 2, wherein the polyolefin microporous membrane is a polyolefin microporous membrane composed mainly of polyethylene.

10. A nonaqueous secondary battery separator according to claim 3, wherein the polyolefin microporous membrane is a polyolefin microporous membrane composed mainly of polyethylene.

11. A nonaqueous secondary battery separator according to claim 8, wherein the polyolefin microporous membrane is a polyolefin microporous membrane composed mainly of polyethylene.

12. A process for fabrication of a nonaqueous battery separator according to claim 2, comprising the following steps in order:
(1) a step of dissolving polymetaphenylene isophthalamide in a solvent composed mainly of an amide-based solvent to prepare a polymer solution,
(2) a step of coating both sides of the polyolefin microporous membrane with the polymer solution,
(3) a step of transporting the polymer solution-coated polyolefin microporous membrane,
(4) a step of immersing the polymer solution-coated polyolefin microporous membrane in a solidifying solution comprising the solvent and water in such a manner that both the front and back sides contact with the solidifying solution for solidification of the polymetaphenylene isophthalamide, (5) a step of rinsing the solidified composite membrane, and (6) a step of drying the rinsed composite membrane.

13. A process for fabrication of a nonaqueous secondary battery separator according to claim 12, characterized in that the polymer solution contains a phase separating agent at a concentration of 5-50 wt %.

14. A process for fabrication of a nonaqueous secondary battery separator according to claim 6, characterized in that the proportion of water in the solidifying solution is 30-80 wt %.

15. A process for fabrication of a nonaqueous secondary battery separator according to claim 12, characterized in that the proportion of water in the solidifying solution is 30-80 wt %.

16. A process for fabrication of a nonaqueous secondary battery separator according to claim 13, characterized in that the proportion of water in the solidifying solution is 30-80 wt %.

17. A nonaqueous secondary battery separator according to claim 1, wherein the total coating amount is between $1.0 \, g/m^2$ and $2.4 \, g/m^2$.

18. A process for fabrication of a nonaqueous secondary battery separator according to claim 5, wherein the polymetaphenyleneisophthalamide has a logarithmic viscosity of 0.8-2.5 dL/g.

19. A process for fabrication of a nonaqueous secondary battery separator according to claim 12, wherein the polymetaphenyleneisophthalamide has a logarithmic viscosity of 0.8-2.5 dL/g.

20. A nonaqueous secondary battery separator according to claim 1, wherein the polyolefin microporous membrane has a gas permeability (JIS P8117) of between 15 seconds/100 cc·μm and 25 seconds/100 cc·μm per unit thickness.

21. A nonaqueous secondary battery separator according to claim 1, wherein the polymetaphenylene isophthalamide total coating amount of both sides is between $1.0 \, g/m^2$ and $2.4 \, g/m^2$.

22. A nonaqueous secondary battery separator according to claim 1, wherein the polymetaphenylene isophthalamide total coating amount of both sides is between $1.8 \, g/m^2$ and $2.4 \, g/m^2$.

* * * * *